Jan. 3, 1967 R. DETHMERS 3,295,481
LIQUID FERTILIZER SHOE FOR PLANTERS
Filed May 27, 1965
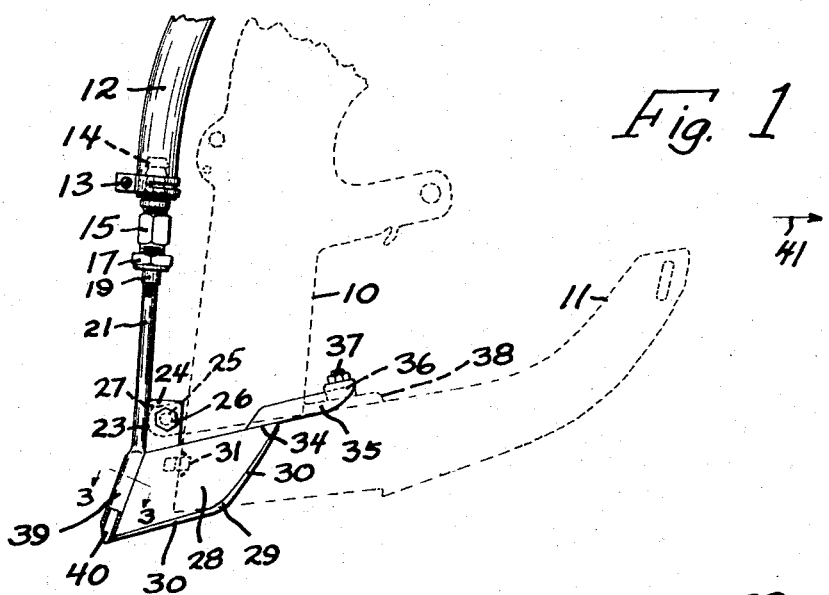
Fig. 1
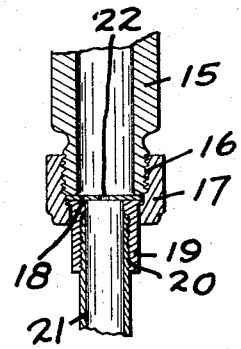
Fig. 3
Fig. 4
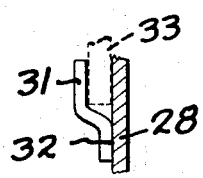
Fig. 2
INVENTOR.
Robert Dethmers
BY
*Sam J. Slotsky*
ATTORNEY

United States Patent Office 3,295,481
Patented Jan. 3, 1967

3,295,481
LIQUID FERTILIZER SHOE FOR PLANTERS
Robert Dethmers, Boyden, Iowa 51234
Filed May 27, 1965, Ser. No. 459,261
3 Claims. (Cl. 111—7)

My invention relates to a liquid fertilizer shoe for planters.

An object of my invention is to provide a simple device which can be readily attached to a planter portion.

A further object of my invention is to provide a shoe along which the liquid fertilizer will pass and which fertilizer will be evenly deposited into the ground.

A further object of my invention is to provide a shoe which will be sufficiently supported against lateral movement.

A further object of my invention is to provide an arrangement whereby the rate of flow of the fertilizer fluid can be adjusted.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of my type of fertilizer shoe as attached to the planter portions, FIGURE 2 is an enlarged detail, FIGURE 3 is an enlarged sectional view taken along the lines 3—3 of FIGURE 1 and, FIGURE 4 is an enlarged sectional detail of the fertilizer flow regulator arrangement.

My invention contemplates the provision of an efficiently operated and rigidly supported fertilizer device which can be readily attached to planter parts.

In describing my invention I have used the character 10 to designate by dotted lines, certain planter portions, or the portions through which the seed is deposited, the character 11 indicating further portions.

I have further used the character 12 to indicate a flexible tube which passes to any desired source of supply such as any type of container which contains the fertilizer fluid, the tube 12 being clamped by means of the clamp 13 to the portion 14 which extends into a housing 15 (see FIGURE 4) and threadably engaging the housing 15 at 16 is a nut 17 which bears against a washer 18, which washer 18 bears against a sleeve 19 which is suitably secured at 20 to the vertically positioned tube 21.

The washer 18 including an opening at 22, and there can be provided several of such washers 18 each of which will have a different size opening 22 to thereby regulate the rate of flow of the liquid downwardly.

The tube 21 is suitably atached at 23 to a flange 24 which includes a suitable opening at 25, whereby the flange 24 can be bolted as at 26 to the extending flange portion 27 of the member 10.

The character 31 indicates a clip suitably attached at 32 to the blade 28, and which clip is adapted to receive the extending flange portions 33 of the member 10, and to thereby secure the shoe arrangement against lateral movement.

Attached at 34 to the blade 28 is a further flange 35 which includes the horizontal integral portion 36 by which the flange 35 and shoe can be bolted as at 37 to the planter flange portion 38.

The tube 21 includes the downwardly extending angularly positioned portion 39 which portion is slightly flattened as shown in FIGURE 3 to provide means whereby the tube will pass freely through the soil, and this portion 39 terminates in the lower opening 40.

The character 41 in FIGURE 1 illustrates the direction of travel of the planter and shoe, and it will be noted that the fertilizer passing downwardly through the tube 21 will be fed through the opening 40 and will penetrate about the seed so as to provide the proper fertilizing effect. The opening 40 is positioned so that the fertilizer will pass slightly beside and below the seed where it is needed for best results, and the shoe will pass efficiently through the ground due to the structure explained above.

Also as explained above the amount of flow can be regulated to suit the necessary requirements.

It will now be noted that I have provided the various advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A liquid fertilizer shoe for planters comprising a vertically positioned blade, a vertically positioned tube attached to the trailing edge of said blade, a vertically positioned flange attached to said tube, means for bolting said flange to a planter framework portion, a further forwardly positioned flange attached to said blade including a substantially horizontal further flange, means for bolting said substantially horizontal further flange to a further planter framework portion, 2. A liquid fertilizer shoe for planters comprising a vertically positioned blade, a vertically positioned tube attached to the trailing edge of said blade, a vertically positioned flange attached to said tube, means for bolting said flange to a planter framework portion, a further forwardly positioned flange attached to said blade including a substantially horizontal further flange, means for bolting said substantially horizontal further flange to a further planter framework portion, said blade having a lower arcuate sharpened edge, said vertically positioned tube being attached to a liquid fertilizer supply, means for controlling the rate of flow of liquid fertilizer through said tube, the lower end of said tube being slightly flattened, 3. A liquid fertilizer shoe for planters comprising a vertically positioned blade, a vertically positioned tube attached to the trailing edge of said blade, a vertically positioned flange attached to said tube, means for bolting said flange to a planter framework portion, a further forwardly positioned flange attached to said blade including a substantially horizontal further flange, means for bolting said substantially horizontal further flange to a further planter framework portion, said blade having a lower arcuate sharpened edge, said vertically positioned tube being attached to a liquid fertilizer supply, means for controlling the rate of flow of liquid fertilizer through said tube, the lower end of said tube being slightly flattened, a clip attached to said blade adapted to receive a planter framework portion to prevent lateral displacement of said shoe.

References Cited by the Examiner
UNITED STATES PATENTS

| | | | |
|---|---|---|---|
| 2,903,982 | 9/1959 | Floy | 111—7 |
| 2,924,187 | 2/1960 | Zimmerman | 111—7 |
| 2,988,026 | 6/1961 | Heckathorn | 111—7 |
| 3,038,424 | 6/1962 | Johnson | 111—7 |

ABRAHAM G. STONE, Primary Examiner.

R. E. BAGWILL, Assistant Examiner.